Oct. 21, 1930.  W. E. WALL  1,779,379
TOOL FOR PERMANENTLY REMOVING SUCKERS FROM TOBACCO PLANTS
Filed Oct. 15, 1927
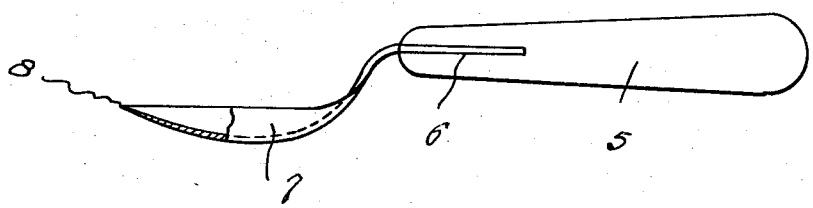
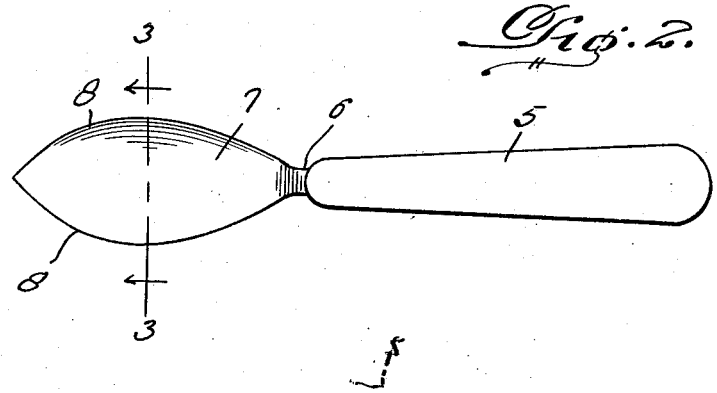
Inventor
W. E. Wall,
By Clarence A. O'Brien
Attorney Patented Oct. 21, 1930

1,779,379

UNITED STATES PATENT OFFICE

WILLIAM E. WALL, OF PINNACLE, NORTH CAROLINA

TOOL FOR PERMANENTLY REMOVING SUCKERS FROM TOBACCO PLANTS

Application filed October 15, 1927. Serial No. 226,422.

This invention relates to tools or implements adapted particularly for use in permanently removing and eliminating suckers from tobacco plants, said suckers being in the nature of a shoot growing on the tobacco stalk, between the stalk and the leaf and at the base of the leaf, and which, if allowed to remain thereon, would seriously impair and retard the growth of the leaf.

The invention has for an object to provide an article of this character of simple and practical construction, effective for obtaining the desired result, inexpensive to manufacture, easy to manipulate and otherwise well adapted for the purposes for which the same is intended.

Other objects and advantages reside in the special construction and combination of the various parts comprising the invention, reference being had to the accompanying drawings forming a part of this application, wherein:—

Figure 1 is a view in side elevation with part of the blade of the tool shown in section.

Figure 2 is a top plan view, and

Figure 3 is a transverse sectional view through the blade taken along the line 3—3 of Figure 2.

Referring to the drawing in detail, the invention comprises a substantially spoon-shaped tool having a handle member 5 to one end of which is attached the shank 6 of the working end of the tool constituting a blade indicated at 7.

The blade 7 is offset with respect to the shank end 6 thereof whereby to arrange the blade at a horizontal plane beneath the handle. As indicated in Figure 3 of the drawing, the upper surface of the blade is concaved substantially in the nature of a spoon with the side edges 8 thereof sharpened to form a knife edge for the same.

With the tool constructed in a manner as explained above, the same is admirably adapted for permanently eradicating suckers from tobacco plants, the suckers being cut off by the knife edges of the tool and dropped to the ground, the concaved portion of the blade enabling the same to be removed away from the plant and destroyed.

The handle of the instrument may be formed of wood or metal, while the blade 7 is constructed of metal, and properly tempered to retain its sharpened edge, it being understood, however, that any suitable material may be employed in the construction of the article.

It is obvious that the invention is susceptible of various changes and modifications without departing from the spirit and scope of the appended claim or sacrificing any of its advantages and I accordingly claim all such forms of the device to which I am entitled.

I claim:—

A tool for removing suckers from tobacco plants comprising a substantially spoon shaped blade of shallow depth and tapering to a sharpened point at its front edge, and having its rear portion prolonged to provide a substantially elongated narrow shank offset laterally of the plate and parallel thereto, whereby to position the latter in a horizontal plane beneath and parallel to the shank, said blade having its side edges sharpened to form a knife edge, and a handle carried by said shank.

In testimony whereof I affix my signature.

WILLIAM E. WALL.